April 7, 1942.  R. E. SCHENSTED  2,279,281
METHOD OF PHOTOGRAPHING AND PROJECTING STEREOSCOPIC
MOTION PICTURES IN NATURAL COLOR WITH THE USE
OF COLOR CORRECTED BLACK AND WHITE FILM
Filed Sept. 25, 1939
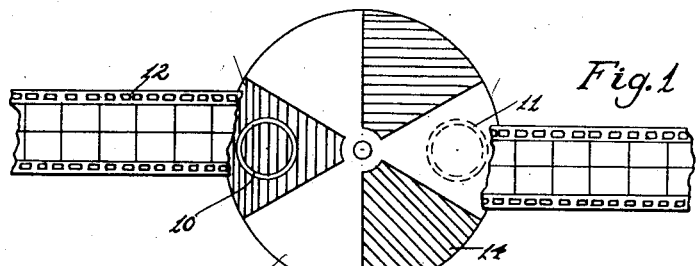
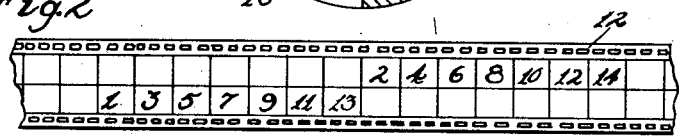
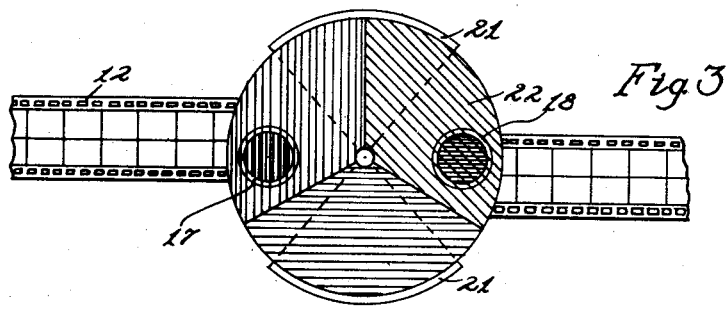
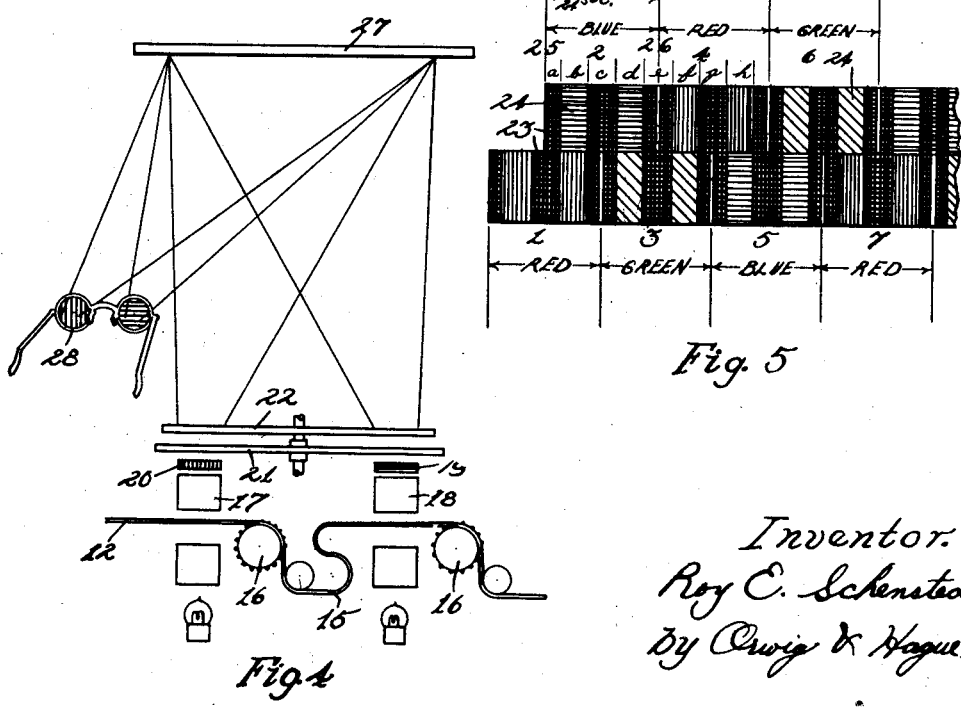
Inventor.
Roy E. Schensted
By Orwig & Hague Attys Patented Apr. 7, 1942

2,279,281

UNITED STATES PATENT OFFICE 2,279,281

METHOD OF PHOTOGRAPHING AND PROJECTING STEREOSCOPIC MOTION PICTURES IN NATURAL COLOR WITH THE USE OF COLOR CORRECTED BLACK AND WHITE FILM

Roy E. Schensted, Clarion, Iowa, assignor of one-half to B. J. Palmer, Scott County, Iowa Application September 25, 1939, Serial No. 296,414

4 Claims. (Cl. 88—16.4)

The object of my invention is to provide an improved method for photographing stereoscopic images supported on color corrected black and white film and projecting motion pictures in natural colors on a suitable screen from said images.

A further object of my invention is to provide an improved method of producing motion pictures in natural colors on a suitable screen in which the images are photographed in such a manner on a color corrected black and while film that the film may be run through the projection machine at substantially the same speed as that utilized in the projection of the ordinary motion pictures.

My invention consists in the construction, arrangement and combination of the various parts of the device, whereby the objects contemplated are attained, as hereinafter more fully set forth, pointed out in my claims and illustrated in the accompanying drawing, in which:

Figure 1 is a diagrammatical view of a film such as is used in my improved process, also showing position of the stereoscopic camera lenses in relation to said film at the time the film is being exposed, and also the relative positions of the shutter and the light filters relative to said lenses;

Figure 2 is a diagrammatical view of the film to illustrate the manner in which the exposures are successively impressed on the film, and the relative positions of the exposures made through the right and left lenses;

Figure 3 is a diagrammatical view of an exposed film showing the position of the film relative to the stereoscopic projection lenses, and the position of the shutter and the color filters relative to said lenses;

Figure 4 is a diagrammatical view showing in top elevation the structure illustrated in Figure 3, and also the manner in which the light from the projection lenses is projected on the screen and in turn reflected to the polarizing filters.

Figure 5 is a diagrammatical view illustrating the relative positions of the right and left images, as taken by a stereoscopic camera, arranged in the relation in which said images are taken, and also the relative position in which images are placed when projected, and the time periods in which said projection takes place and the manner in which all three of the primary contents of the images are always projected in each regular time period.

In carrying out my improved process I provide a suitable camera adapted to impress on a color corrected black and white film, images of an object in motion taken from different angles so as to produce what is commonly known as stereoscopic pictures and employing lenses 10 and 11 illustrated diagrammatically on the drawing. The lens 10 will be hereinafter referred to as the "left lens" for photographing an image that would be observed by the left eye, and the lens 11 will be designated as the "right lens" for photographing an object that would be viewed by the right eye, the camera being constructed to receive a film 12, which is adapted to have impressed on the lower half thereof the images produced by the left lens, and the upper half thereof having impressed thereon images produced by the right lens, the camera being provided with shutters 13 and, intermediately thereof, light filters 14, said filters being of the three primary colors, red, green and blue. The shutters 13 and the filters 14 may be arranged in the form of a disc, which is rotatably mounted on an axis in such a manner that as the disc is rotated, the shutter and filters will be moved successively past the lenses 10 and 11. A feed mechanism for the film is also provided, wherein the film may be fed intermittently past the lenses in the usual manner, the exposures of the lenses 10 and 11 being by this arrangement made alternately, or the film may be mounted in the camera in such a manner that a loop 15 is provided between the lenses 10 and 11 wherein the film behind the lens 10 will be stationary at the time that the portion of the film behind the lens 11 is being moved into position, the film being fed by means of independent feed sprockets 16. The mechanism for operating the feed sprockets, the shutters 13 and the filters 14 is not illustrated or described, due to the fact that it forms no part of my present invention.

The diagrammatical figures are provided for the purpose of illustrating one method whereby images may be formed on a film in a manner that is most desired in carrying out my improved process.

It will be seen that as the film is intermittently advanced through the camera one of the shutters 13 will be brought into position to close the lens 10, while the other lens is opened, and that one of the light filters will at that time be in position in front of the lens, so that the image formed by the exposure will be what I shall term in the specification and claims as a "color content image" as a result of the use of said filter. Thus, it will be seen that if the filter 13 is rotated in a clockwise direction and the film is fed through the camera, one of the left images will be photographed with a red content, the next upper right-hand image will be photographed with a blue color content, and the third exposure will produce a left-hand image having a green color content, as the filter 13 is rotated through one-half revolution, on further rotation of the filter. The fourth exposure will be taken through the lens 11 on the upper edge of the film with the red filter. The fifth exposure will then be taken through the lens 10, with the blue filter at the bottom edge of the film, and the sixth exposure then taken through the lens 11 at the top of the film through the green filter. This completes one revolution of the filter 13 and completes a color cycle, as diagrammatically illustrated in Figure 2. This cycle of operations may be repeated indefinitely for the duration of one scene. The film may then be placed in a projector having left and right projection lenses 17 and 18, as illustrated in Figure 3, said projector including a separate light beam for each of said lenses, and also including a polarizing filter 19 in front of the said lens, and preferably in front of the film, and a second polarized filter 20 in front of the lens 17, polarized in a plane at right angles to the plane of polarization of the filter 19. In front of the filters 19 and 20 is located a two-blade shutter 21 pivotally mounted so that, as the shutter is rotated, the blades will simultaneously cut off the projected light from said lenses and simultaneously permit the projection of said beams of light. Supported in front of the shutter 21 is located a color filter 22 in the form of a disc and comprising three segments, each representing a different one of the three primary colors, red, green and blue. The projector is also adapted to receive the film 12, with the lower portion of the film opposite the left lens 17 and the upper portion opposite the right lens 18.

Means is provided for intermittently feeding the frames of the films past the lenses in regular time intervals, the frame being moved past the right lens 18 at the time the left frame behind the lens 17 is being held stationary. The timing mechanism is so arranged that the left-hand image is held stationary during one revolution of the shutter, and at the time the shutter makes one-half revolution, the frame behind the right lens 18 is advanced. The filter 22 is so timed that it is advanced one-third of a revolution during each time that the shutter makes one revolution or one-sixth revolution during the time the shutter makes one-fourth revolution, as hereinafter more fully set forth.

Having described the manner in which the frames of the film are moved into position back of the lenses and the relative movement of the filters and shutter with respect to the movement of said film, I shall now describe the manner in which the film, as photographed by the operations as illustrated diagrammatically in Figure 2, is projected on a suitable screen in order to properly intermingle the color contents of the exposures to project a complete color image on the screen.

In Figure 5 I have diagrammatically illustrated the relative positions and the order in which the stereoscopic images were photographed on the film, and also the relative positions in which they are projected, the upper row of frames representing those exposed by the right lens of the camera and projected by the right lens of the projector, and those in the lower row, the images photographed by the left lens of the camera and projected by the left lens of the projector; the upper row of images being moved into position directly over the corresponding images of the lower row, instead of being set back a distance therefrom, as illustrated in Figure 2, for the purpose of more clearly illustrating the process; the upper row of images being set back of the corresponding ones of the lower row for the purpose of permitting a loop to be formed in the film, whereby the upper and lower images may be advanced at different time periods. The numerals 1, 2, 3, 4, etc., above and below the frames, indicate the order in which the images were photographed, the image including that portion within each of the rectangular frames. I have divided each of these frames into black and white sections to represent the time period in which the entire lens is closed by the shutter, while the light portions represent the time in which the entire lens is open. It is to be understood that the exposure covers the entire frame and not only a portion of the frame, as might be gathered from the illustration, sections of the frame simply indicating time periods. For instance, the space between the vertical lines 25 and 26 represents what I have termed as a whole time period, equal to substantially one-twenty-fourth of a second, as motion pictures are projected by commercial moving picture concerns; and from this it will be gathered that the time period represents the time required for the projection of one frame, and also represents the time required for the shutter 21 to make one revolution. This time period is also the time period for the photographing of the image. This time period might be any other pre-determined period, such as one-twelfth or one-sixteenth of a second, instead of one-twenty-fourth, as indicated on the diagram. This time period also represents twice the length of time in which one of the color filter elements is in front of the lens. In the diagram each of the full time periods is divided into quarter time periods, the black, or shaded portions 23, representing the quarter time period in which the entire lens is closed, and the lighter portions 24, the quarter time period in which the lens is entirely open. Assuming that a film 12 has been placed in the projector and has intermittently moved to the left and to position with the exposure member 1 back of lens 17, with the red filter over said lens and the green filter over the lens 18, and no exposure over said lens 18, and that the shutter is then rotated one-fourth revolution, closing both lenses as represented by the dark portion a in Figure 5, the filter 22 is then rotated one-sixth revolution in an anti-clockwise direction, with the blue filter over the lens 18 and the red filter still over the lens 17 as at b. Another quarter revolution of the shutter, and the lenses are again covered during the time period c. During this time period the frame No. 1 is moved out of position behind the lens, and frame No. 3 is moved into position behind said lens and the filter 22 again rotated one-sixth revolution. A further quarter revolution of the shutter, and the lenses are again opened in the time period d. At the time the frame No. 3 was shifted into position back of lens 17, the green segment of the color filter was also shifted into position back of said lens with the blue filter still over the lens 18.

From the above it will be seen that during the exposure period b the lenses were under the influence of the blue and red filter, producing the colors blue and red on the screen, and during the time period d, the blue and green filters were over the lenses, projecting blue and green light from the corresponding color contents of the frames 2 and 3. From this it will be seen that during the regular time period of one-twenty-fourth of a second, two exposures of blue light were projected to the screen from frame No. 2, one exposure of red from frame No. 1, and one exposure of green from frame No. 3. During the next quarter revolution of the shutter, the lens will again be darkened during the time period e. At this time frame No. 2 will be moved out of position from behind the lens 18, and frame No. 4 moved into position behind said lens. During the next quarter revolution of the shutter, the red and green light from frames Nos. 3 and 4 will be projected on to the screen, and during the next quarter revolution of the time period g, the lenses will be again darkened and the frame 3 moved out of position from behind the lens 17, and frame No. 5 moved into position, at the same time moving out the green filter and into position the blue filter. During the time period h, the red light from the frame 4 and blue light from frame 5 will be projected on to the screen.

From the above it will be seen that each time the shutter 21 makes a complete revolution, during a complete time period, two exposures of one color and one exposure of each of the other two colors of the three primary colors will be thrown on the screen, so that during every time period of one-twenty-fourth of a second, all three colors will be projected to the screen in the same order that they were photographed, and the resulting color image will, of course, be more or less a mixture of all three colors, resulting in other colors of more or less intensities. Inasmuch as images of only two frames are projected during any single quarter time period, and inasmuch as these images are taken from different viewpoints, it will be seen that the said projected images will give the effect of three dimensions, or what is commonly known as a stereoscopic effect; and inasmuch as during each time period three frames, having their corresponding color contents, are moved into position behind the two lenses, it will be seen that all three primary colors will be projected on the screen, so that although the three colors are projected in two separate projections, yet they fall within the time period of one-twenty-fourth of a second, which is less than the time in which an image is retained on the retina of the eye. Therefore, during each time period, a complete stereoscopic image and also a complete color image are produced on the screen.

The light from the lenses 17 and 18 are projected to the screen 27, in the manner illustrated in Figure 4, and reflected through polarized eye glasses 28, which are worn by the observer, so that the polarized light projected by the right-hand lens will be received by the right eye of the observer through the corresponding polarizing lens. In like manner, only that portion of the light projected by the left lens will be observed by the left eye, thus providing means whereby the images projected to the screen will be observed in third dimension and in natural color from images photographed on color corrected black and white film.

A further advantage of my method is that, both the stereoscopic images and the natural colors or images may be projected with a comparatively small amount of equipment and by the use of ordinary color corrected black and white film, as the images from both right and left lenses are projected simultaneously and within the regular time period.

I have illustrated and described my improved process by the use of three primary colors, but it will readily be seen that a greater number of primary colors may be used by correspondingly increasing the number of filters and the speed of the exposures and projections during a regular time period, without departing from the spirit of my invention.

It will be seen from the above description, that by binocular perception of color and depth I have combined in a single way an inexpensive method of producing stereoscopic motion pictures, in natural color, with the same facility that governs the process of producing present day black and white film. In the claims I have used the term "frame period" to designate the interval in which the frames of the projector are moved into and out of operative position.

I claim as my invention:

1. The method of projecting stereoscopic motion pictures to a suitable screen from color corrected black and white film bearing color content stereoscopic images each having only one color value of a given three primary color combination and in which the right and left stereoscopic images were photographed alternately and the three color values imprinted thereon successively in regular sequence, which consists in providing a suitable projector having a pair of binocular lenses providing a separate light beam for each lens, feeding the right and left images alternately into and out of position in optical alignment with respective lenses in equal time periods of one-half of a frame period at which the projector is operating, simultaneously cutting off the light of both light beams each time an image is advanced, then moving the shutter to open position during intermittent time periods, wherein two pairs of projections take place during each frame period and wherein one of three adjacent right and left images will be projected twice and one of each of the other two of said three images will be projected once during said frame period, and including in each projected light beam a color filter corresponding to the color content of the image being projected, whereby only two images and their corresponding colors will be projected at any given time to prevent color fringe, and at the same time produce in the eye of the observer the sensation of a complete color image embodying all of said three colors.

2. The method of projecting stereoscopic motion pictures in natural color to a suitable screen from color corrected black and white film bearing color content stereoscopic images each having only one color value of a given three primary color combination and in which the right and left stereoscopic images were photographed alternately and the three color values imprinted thereon successively in regular sequence, which consists in projecting simultaneously in the order in which they were photographed, two adjacent images to a suitable screen during a portion of a time period equal to the frame period of the projector, by light beams corresponding respectively to the color value of the images being projected, and again simultaneously projecting one of the first images and another adjacent one of said three color images during another portion of said time period, with dark intervals between each pair of simultaneous projections, whereby only two colors of the three color combination will be projected at any one time to prevent color fringe, and at the same time impress in the eye of the observer the sensation of a complete color image containing all three colors 3. The method of projecting stereoscopic motion pictures to a suitable screen to prevent color fringe from color corrected black and white film bearing color content stereoscopic images each having only one color value of a given three primary color combination and in which the right and left stereoscopic images were photographed alternately and three color values imprinted thereon successively in regular sequence, which consists in projecting the right series of images by a polarized light beam of colors corresponding to the color contents of the images, and the left series of images by another polarized light beam of colors corresponding to the color content of said images and of a different plane, feeding the respective images alternately into said light beams and simultaneously projecting two adjoining right and left images in regular sequence and the order in which they were photographed, momentarily shutting off each light beam each time a corresponding image is advanced into operative position, viewing the projected images through polarized glasses at different planes wherein the right and left images and their respective colors will be viewed only by corresponding eyes, wherein one of the right and left color images will be retained by the corresponding eye during the time in which light is shut off from the other eye and during the time in which one of the other right and left images is being moved out of operative position and the adjacent one into operative position.

4. The method of projecting stereoscopic motion pictures to a suitable screen to prevent color fringe from color corrected black and white film bearing color content stereoscopic images each having only one color value of a given three primary color combination and in which the right and left stereoscopic images were photographed alternately and three color values imprinted thereon successively in regular sequence, which consists in projecting successively and simultaneously an adjoining right and left image each by a separate polarized light beam of different planes, to a suitable screen, superimposed one on another, feeding the images of the right and left series of images alternately in their respective light beams, momentarily shutting off the light of each beam each time a corresponding image is advanced, successively intercepting in each light beam a filter of one of the three primary colors corresponding to the color content of the images being projected, then viewing the projected images through polarized glasses wherein right and left images and their corresponding colors may be viewed only by the corresponding eyes and wherein one of the right and left color images will be retained by the corresponding eye during the time in which light is shut off from the other eye and during the time in which one of the other right and left images is being moved out of operative position and the adjacent one into operative position.

ROY E. SCHENSTED.